United States Patent

Krohn

[11] Patent Number: 5,959,727
[45] Date of Patent: Sep. 28, 1999

[54] SYSTEM AND METHOD FOR DISCRIMINATING BETWEEN DIRECT AND REFLECTED ELECTROMAGNETIC ENERGY

[75] Inventor: William T. Krohn, Sandy Hook, Conn.

[73] Assignee: Raytheon Company, Lexington, Mass.

[21] Appl. No.: 08/905,233

[22] Filed: Aug. 1, 1997

[51] Int. Cl.$^6$ ............................................. G01J 1/10
[52] U.S. Cl. ........................... 356/229; 356/213; 356/222; 356/445
[58] Field of Search .................................. 356/229, 213, 356/222, 445

[56] References Cited

U.S. PATENT DOCUMENTS

| | | | |
|---|---|---|---|
| 4,494,873 | 1/1985 | Perlmutter et al. | 356/350 |
| 4,804,832 | 2/1989 | Gardner | 250/203 R |

*Primary Examiner*—Robert H. Kim
*Assistant Examiner*—Reginald A. Ratliff
*Attorney, Agent, or Firm*—W. C. Schubert; G. H. Lenzen, Jr.

[57] ABSTRACT

An energy beam threat discrimination system (110) adapted for use with laser beam energy (134). The system (110) includes an first detector (114) for detecting a first laser signal. A second detector (112) detects a coherent laser signal. A timer circuit (124, 126) establishes a time interval between the detection of the first laser signal and the detection of the coherent laser signal and provides an output (130) in response thereto. A control circuit (128, 130) determines, based on the output (130), if the first laser signal and/or the second laser signal is threatening. In a specific embodiment, the first detector (114) provides an event detection flag (118) as an output in response to the detection of a first laser signal. The first detector (114) includes a high sensitivity laser light detector (142), a pre-amplifier (144), and an analog threshold circuit (146). The coherent detector (112) provides a coherent detection flag (116) as an output in response to the detection of the coherent laser signal. The timing circuit (124, 126) receives the event detection flag (118) as input and includes a digital clock circuit (124) that starts a timer (126) upon receipt of the event detection flag (118). The control circuit (128) includes a digital comparator circuit (128) in communication with the timing circuit (124, 126), and receives the coherent detection flag (116) as input. The digital comparator circuit (128) is activated by the receipt of the coherent detection flag (116) which triggers a comparison between the output (130) of the timer circuit (124, 126) and a time threshold (131) and provides a reflection signal output indicating if the laser signal is a potential threat or not. The time threshold (131) is the maximum time value allowable for the output (130) for determining that the laser signal is a potential threat and is approximately 10 nanoseconds. Alternatively, the time threshold is the maximum time value allowable for the output (130) for determining that the laser signal is not a potential threat and is approximately 40 microseconds.

24 Claims, 8 Drawing Sheets

FIG. 10

SYSTEM AND METHOD FOR DISCRIMINATING BETWEEN DIRECT AND REFLECTED ELECTROMAGNETIC ENERGY

BACKGROUND OF THE INVENTION

1. Field of Invention

This invention relates to laser detection. Specifically, the present invention relates to laser warning systems used to distinguish threatening laser energy from other laser energy.

2. Description of the Related Art

Laser detection systems are used in a variety of demanding applications ranging from tactical military applications to police laser guns used to measure automobile speed. Such systems require reliable sensors and associated electronics that can consistently distinguish between important signals and stray or reflected signals.

A laser is a device that that emits a beam of electromagnetic energy having certain special properties. Laser energy is light that is collimated, coherent, and monochromatic, i.e., is comprised of waves having similar frequencies and phases. In the atmosphere, air molecules may scatter laser energy. The scattered, often incoherent laser energy is often detectable over one hundred feet away from the original laser beam. A typical laser detector in a laser warning system can detect the main laser beam in addition to energy scattered therefrom.

Ground combat applications require systems that can readily distinguish between direct and reflected laser energy. To detect laser energy, a Fabry Perot etalon is often employed to determine the coherence of laser energy. A Fabry-Perot etalon is disclosed in U.S. Pat. No. 4,309,108 entitled ANALYZER FOR COHERENT RADIATION, issued Jan. 5, 1982 to Edward T. Siebert, the teachings of which are herein incorporated by reference. A laser detection system employing a Fabry-Perot etalon uses coherence and intensity to separate threatening laser light from stray or reflected electromagnetic energy. A skimming beam having an indirect angle of arrival may not provide sufficient contrast to trigger a detection. Also, dim light having an intensity below a given threshold is rejected. However, laser energy reflected from objects on the ground and received by a laser warning system on a tank, for example, may have sufficient intensity to trigger a detection or alarm. If the laser energy reflects from an adjacent friendly tank, the laser warning system may initiate counter-measures with respect to the friendly tank. This is distracting and sometimes dangerous. Hence, systems relying exclusively on the Fabry-Perot etalon may fail to consistently distinguish direct laser light from reflected laser light.

Hence, a need exists in the art for a system that can readily distinguish between an actual laser threat and stray or reflected electromagnetic energy. There is a further need for a laser warning system that is adapted for use in ground based applications.

SUMMARY OF THE INVENTION

The need in the art is addressed by the laser threat discrimination system of the present invention. In the illustrative embodiment, the inventive system is adapted for use with laser energy and includes a first detector for detecting a first signal. A second detector detects a coherent signal. A timer circuit establishes a time interval between the detection of the first signal and the detection of the coherent signal and provides an output in response thereto. A control circuit determines, based on the output, if the first signal and/or the second signal is a direct signal or a reflected signal.

In a specific embodiment, the signal detector provides an event detection flag as an output in response to the detection of a first laser signal. The event detector includes a high sensitivity laser light detector, a pre-amplifier, and an analog threshold circuit. The coherent detector provides a coherent detection flag as an output in response to the detection of the coherent laser signal. The timing circuit receives the event detection flag as input and includes a digital clock circuit that starts a timer upon receipt of the event detection flag. The control circuit includes a digital comparator circuit in communication with the timing circuit, and receives the coherent detection flag as input. The digital comparator circuit is activated by the receipt of the coherent detection flag which triggers a comparison between the output of the timer circuit and a time threshold and provides a reflection signal output indicating if the laser signal is a potential threat or not. The time threshold is the maximum time value allowable for the output for determining that the laser signal is a potential threat and is approximately 10 nanoseconds. Alternatively, the time threshold is the minimum time value allowable for the output for determining that the laser signal is a potential threat and is approximately 40 microseconds.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
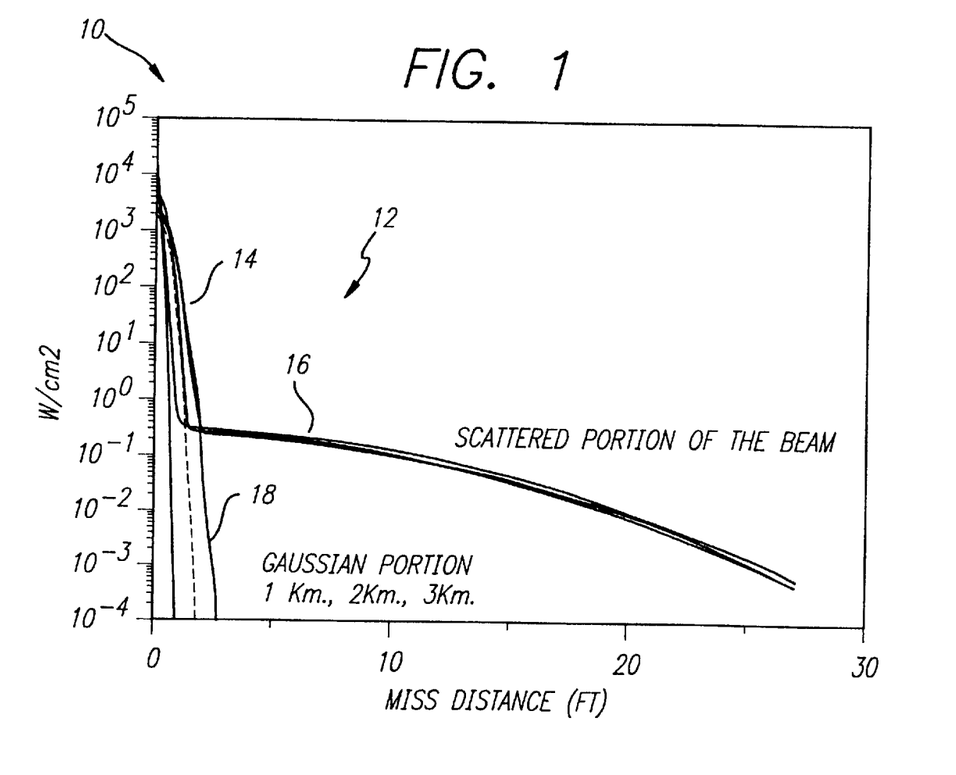
FIG. 1 is a graph showing typical laser beam profiles.

FIG. 1 is a graph 10 showing some typical military laser beam profiles 12. The profiles 10 are plotted as a function of energy density in Watts per square centimeter (corresponding to the vertical axis) versus miss distance in feet (corresponding to the horizontal axis).

As shown in the graph 10, electromagnetic energy from a laser beam is typically most dense in a narrow region 14 about the center of the beam. Because of atmospheric effects, i.e., Mie scattering from aerosols in the laser beam path, an incoming laser pulse's radiation will be spread beyond a classical Gaussian profile corresponding to the Gaussian section 18.

A scattered portion 16 of the beam can be easily detected by a standard low noise optical detector designed to detect a beam who's center is approximately 100 feet from the sensor. However, such a detector will typically detect any optical radiation with a proper time profile and therefore may false trigger on optical events other than laser signals occurring on the battlefield. To prevent such false triggering and to limit detection to only radiation aimed near the sensor, laser detection systems often employ a set of Fabry-Perot etalons. Fabry-Perot etalons help to distinguish non laser light from laser light. However, systems employing the Fabry-Perot etalon can fail to consistently distinguish direct laser light from reflected laser light.

Figure 2:
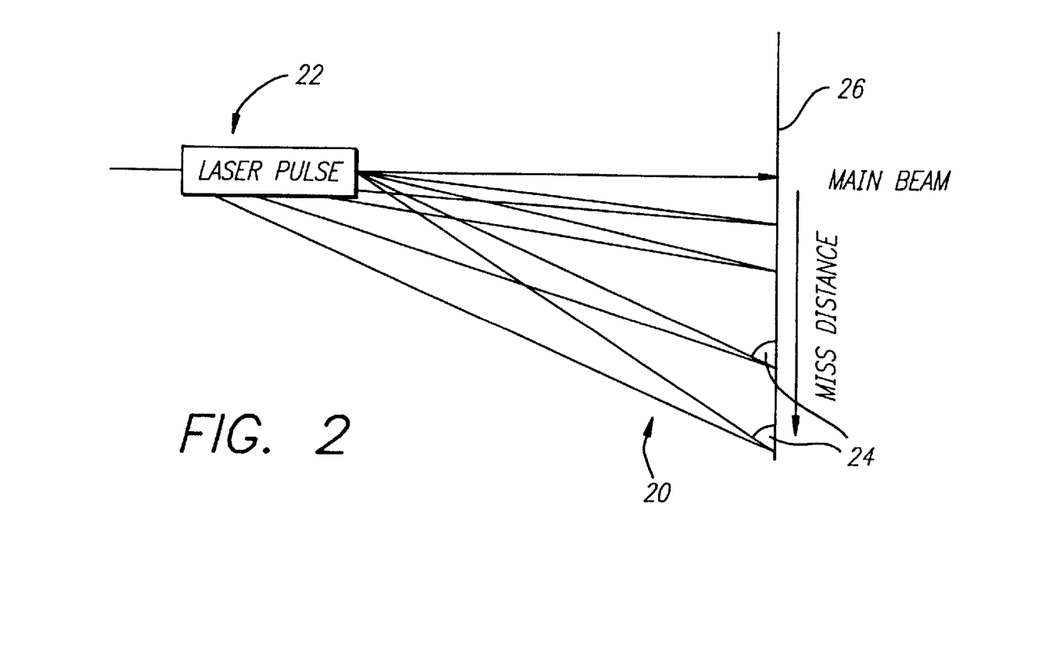
FIG. 2 is a diagram showing scattered energy from a laser pulse illustrating the relationship between the angle of arrival of scattered energy and miss distance.

FIG. 2 is a diagram showing scattered energy 20 from a laser pulse 22 illustrating the relationship between angles of arrival 24 of the scattered energy 20 and miss distance corresponding to a vertical axis 26. As the miss distance decreases, the angles of arrival 24 become more direct, i.e. move from 180 degrees toward 90 degrees, where 90 degrees corresponds to the orientation of the vertical axis 26 and 180 degrees is horizontal.

A Fabry-Perot etalon provides laser only detection until either the laser radiation intensity falls below a detection threshold or the angles 24 lie outside an acceptable angle range needed for sufficient contrast through the etalon. Beyond or below the acceptable angle range, the Fabry-Perot etalon stops providing contrast sufficient for laser detection. However, reflected energy from nearby objects will provide sufficient contrast for detection as long as the angle of arrival and intensity conditions are met.

Use of typical laser warning systems employing the Fabry-Perot etalon can lead to false detection when the laser is not threatening the host vehicle or it can lead to incorrect angle of arrival reporting (to a sensor head accuracy) when both the initial beam and its reflection are detected by two or more sensors on the same vehicle.

Figure 3:
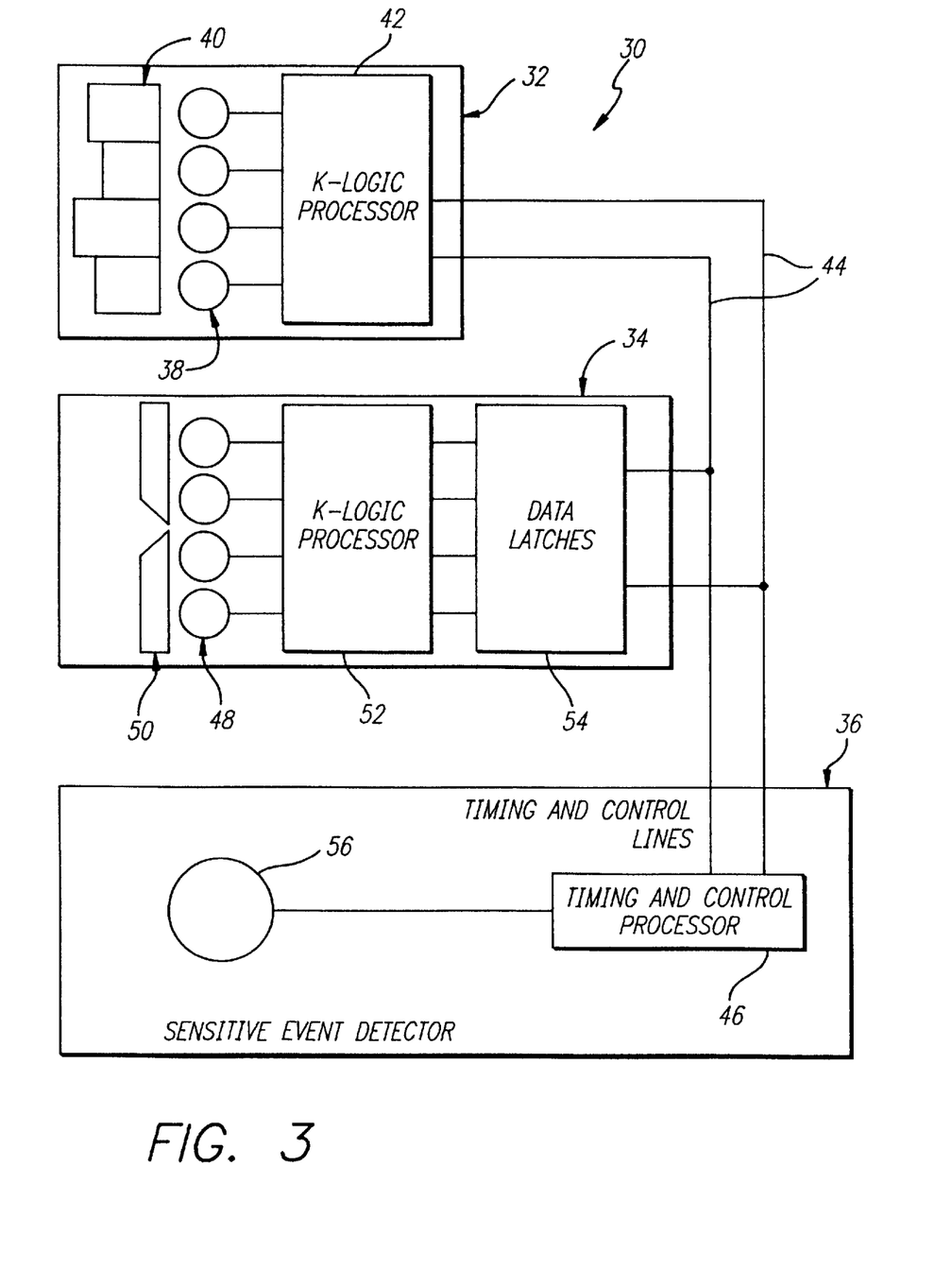
FIG. 3 is a block diagram of a conventional laser detection system.

FIG. 3 is a block diagram of a typical laser detection system 30 that may implement the Fabry-Perot method of laser detection. The system 30 includes a standard Fabry-Perot laser detector 32, a standard laser angle of arrival Grey code detector 34 and a standard event detector 36.

The Fabry-Perot laser detector 32 has four sensors 38 having corresponding filters 40. Each sensor 38 senses laser energy arriving in a 90 degree span about the system 30. The four sensors 38 together monitor a 360 degree field about the system 30 and any corresponding host vehicle. The sensors 38 are connected to a first K-logic processor 42 that prepares timing and control signals 44 for processing via a timing and control processor 46 included in the sensitive event detector 36.

The Grey code detector 34 also includes four sensors 48 and corresponding filters 50. The sensors 48 are connected to a second K-logic processor 52 that provides output to a set of data latches 54. Output from the latches 54 is also provided on the timing and control lines 44.

The event detector 36 includes a highly sensitive first sensor 56 designed to detect farther out from a host vehicle than the sensors 38, 48 of the detectors 32 and 34, respectively. Information corresponding to an initial event detection is provided by the first sensor 56 to the timing and control processor 46 that helps determine whether or not to issue a laser warning based on properties of laser energy received by one or more of the sensors 38, 48, and 56.

Figure 4:
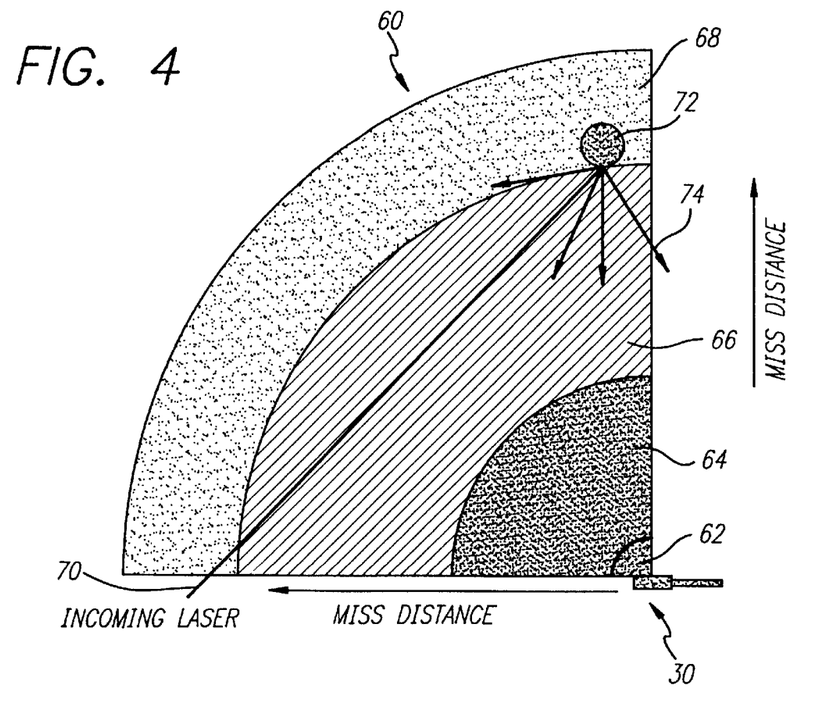
FIG. 4 is a diagram showing a typical laser detection quadrant and associated detection regions.

FIG. 4 is a diagram showing a quadrant of a typical laser detector along with associated detection regions (also known as detection zones) 60. The quadrant 60 represents a ninety degree sector about the laser detection system 30. The quadrant 60 includes a coherent detection zone 62, a direct event detection zone 64, a potential coherent reflection detection zone 66, and a potential reflection detection zone 68.

The coherent detection zone 60 is the region closest to the laser detection system 30. In this zone 60, the Fabry-Perot laser detector (see FIG. 3) and the Grey code laser detector of the system 30 may detect coherent laser energy that exceeds a given intensity threshold. The direct event detection zone 64 extends beyond the coherent detection zone 62. The direct event detection zone 64 corresponds to the region in which the event detector of the system 30 can detect a laser beam. The potential coherent reflection detection zone 66 extends beyond the direct event detection zone 64 and is a region in which laser energy 70, when reflected from a typical reflecting object inside the zone 66, will potentially provide reflected energy sufficient to enter the coherent detection zone 62 and trigger a coherent detection. The reflected energy may be intense enough and have the proper angle of arrival for coherent detection. Objects in the potential reflection detection zones 66, 68 may lead to incorrect angle of arrival reporting by the sensors of the system 30, as the reported angle corresponds to the angle of arrival of the reflected signal rather than the angle of arrival of the incoming laser 70.

The potential reflection detection zone 68 extends beyond the potential coherent reflection detection zone 66 and is a region in which laser energy 70, when reflected from a typical reflecting object 72 inside the zone 68, will potentially provide reflected energy 74 sufficient to enter the direct event detection zone 64 and trigger a detection by the event detector of the system 30.

Figure 5:
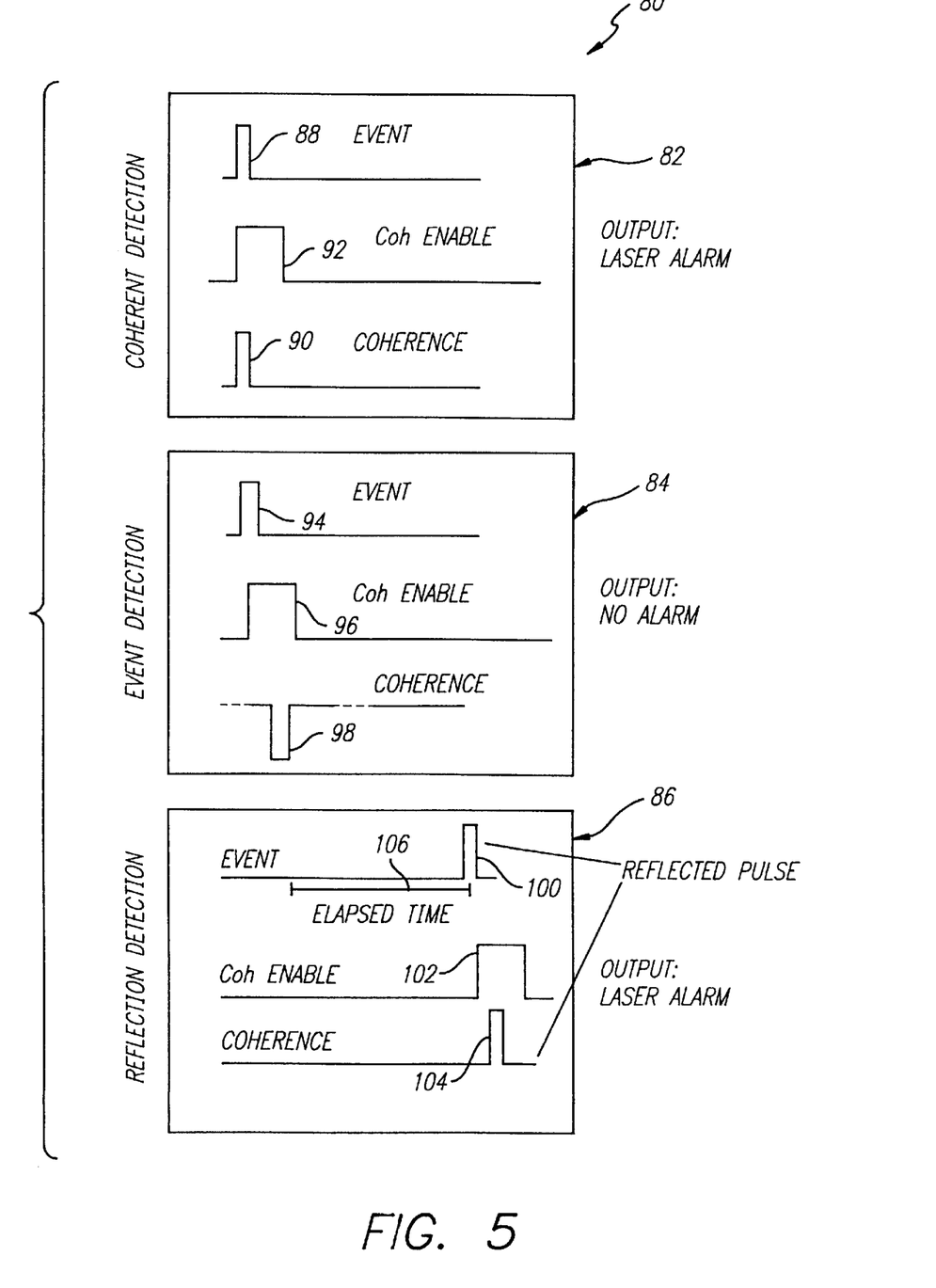
FIG. 5 is a timing diagram illustrating the method employed by the laser detection system of FIG. 3.

FIG. 5 is a timing diagram 80 illustrating a method employed by the laser detection system of FIG. 3. The diagram 80 includes a first 82, second 84 and third 86 frame illustrating an exemplary sequence of laser signals. In each frame 82, 84, 86, time is represented by the horizontal dimension and increases from left to right.

In the first frame 82, an event represented by a pulse 88 is detected by the Fabry-Perot (see FIG. 4) when an coherent detector enabling pulse 92 is high. The pulses 88, 90, 92 begin simultaneously indicating that the event 88 was determined to be coherent when it was initially detected. This in turn causes the timing and control circuit to trigger a laser alarm.

In the second frame 84, a laser signal corresponding to an event pulse 94 is first detected by the event detector which subsequently enables the Fabry-Perot and/or Grey code detector via a coherent detector enabling pulse 96. Subsequently, a negative coherence pulse 98 occurs indicating that the event corresponding to the event pulse 94 was not a coherent event. This in turn causes the timing and control circuit to not issue a laser alarm because the detected event was likely either not due to a laser or was due to a laser not aimed at the host vehicle.

In the third frame 86, an event 100 occurs shortly after the event 94 which triggers a coherent detector enabling pulse 102 and is followed by a coherent detection as indicated by a coherence pulse 104. This causes the timing and control circuit to issue an alarm as a coherent laser signal was detected. However, this alarm is most likely a false alarm and is due to a reflection off of a nearby object as evidenced by the elapsed time 106 between the events 94, 96, 98 and the events 100, 102, and 104.

Figure 6A:
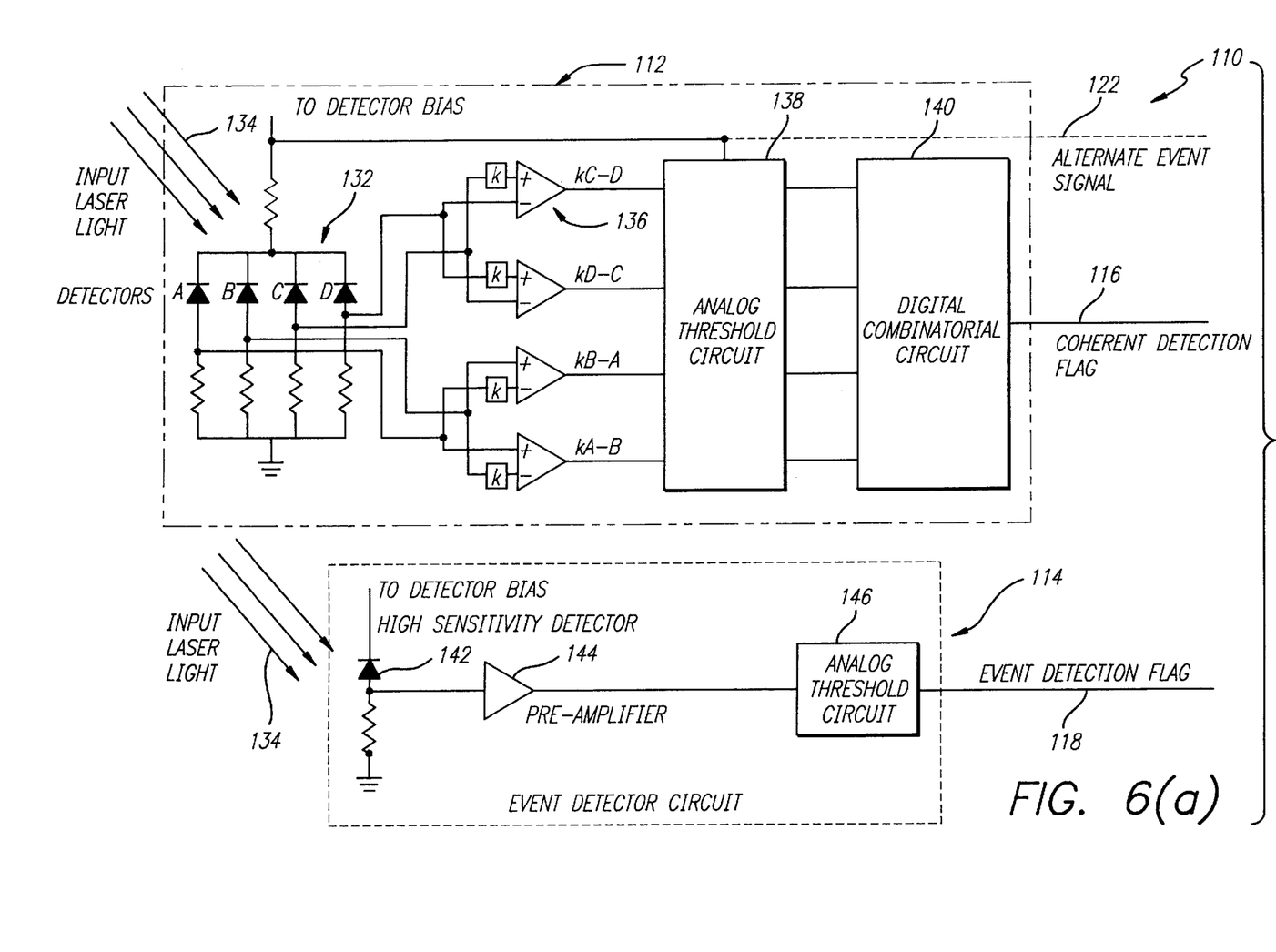
FIGS. 6(a) and (b) is a block diagram of a laser detection system capable of distinguishing direct laser energy from reflected laser energy constructed in accordance with the teachings of the present invention.
Figure 6B:
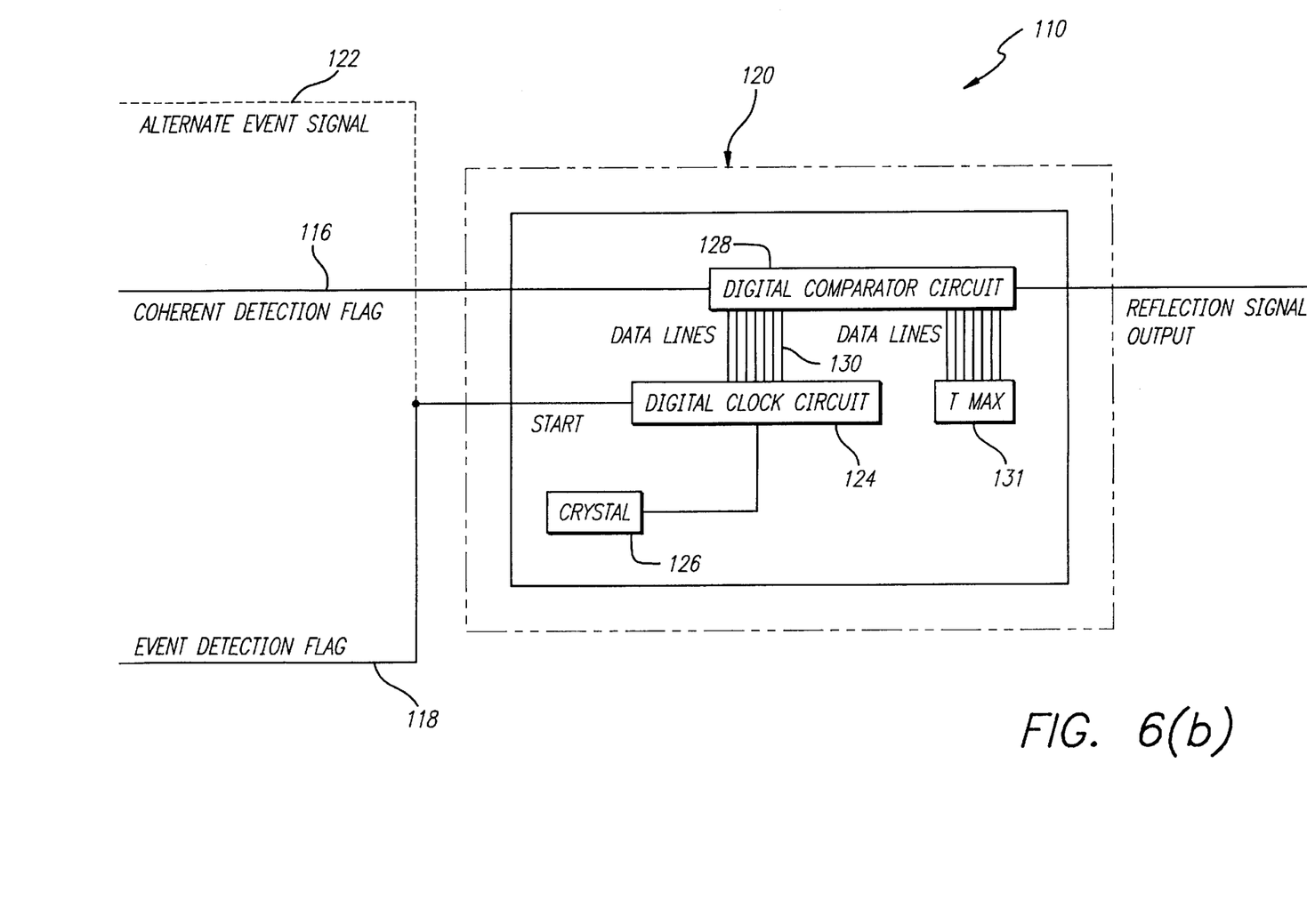

FIGS. 6(a) and (b) are block diagrams of a laser detection system 110 capable of distinguishing direct laser energy from reflected laser energy constructed in accordance with the teachings of the present invention. The laser detection system 110 includes a coherent detection circuit 112 for detecting coherent laser energy in a region corresponding to the coherent detection zone 62 of FIG. 3. An event detection circuit 114 is included to detect electromagnetic events occurring in the direct event detection zone 64 of FIG. 3. Energy reflected into the coherent detection zone and/or the event detection zone may also be detected by the associated detection circuit 112, or 114, respectively.

The coherent detection circuit 112 outputs a coherent detection flag 116 if a coherent detection has been made to a reflected signal determination circuit 120. The event detection circuit 114 outputs an event detection flag 118 to the reflected signal determination circuit 120 that indicates an event detection. An alternate event signal 122 (shown in phantom) from the coherent detection circuit 112 may be used in place of the event detection flag 118. The alternate event signal 122 signifies that the coherent detection circuit 112 has detected light energy which has not necessarily been determined to be coherent energy yet.

The reflected signal determination circuit 120 includes a digital clock circuit 124 that keeps track of time via a crystal oscillator 126. The digital clock circuit 124 receives the event detection flag 118 or the alternate event signal 122 as input. The receipt of a high pulse on the event detection flag 18 resets the digital clock circuit 124 which begins timing. The coherent detection flag 116 is input into a digital comparator circuit 128 that is connected to the digital clock circuit 124 via data lines 130. Upon receipt of a high pulse on the coherent detection flag 116 by the digital comparator circuit 128, the current time on the digital clock circuit 124 is noted by the digital comparator circuit 128 via the data lines 130. The current time corresponds to the duration between the detection of an event by the event detector circuit 114 and the detection of a corresponding coherent event by the coherent detection circuit 112.

This time duration is compared to time thresholds stored in a time threshold storage circuit 131. The time thresholds include a minimum time Tn and a maximum time $T_{max}$. If, as determined by the digital comparator circuit 128, the time duration is less than $T_{max}$ and greater than $T_{min}$ then the signal is declared to be a reflection. Otherwise the detected energy is not declared to be a reflection. In the present embodiment, $T_{max}$ is approximately 40 nanoseconds while $T_{min}$ is approximately 40 microseconds. Those skilled in the art will appreciate that other time thresholds may be chosen to match different laser warning system design criteria.

The modules corresponding to the digital comparator circuit 128, the time threshold storage circuit 131, the digital clock circuit 124, and the crystal oscillator 126 are standard electronic modules.

The coherent detection circuit 112 is constructed in accordance with the teachings of U.S. Pat. No. 4,536,089 entitled ANALYZER FOR COHERENT RADIATION and issued Aug. 20, 1985 to Edward T. Siebert and U.S. Pat. No. 4,309,108 entitled ANALYZER FOR COHERENT RADIA- TION and issued Jan. 5, 1982 to Edward T. Siebert, the teachings of each of which are incorporated herein by reference. The detection circuit includes several energy detectors 132 for detecting laser light 134. The detectors 132 convert optical energy into electrical energy that is then amplified by amplifiers 136. The amplified signals are then processed via a analog threshold circuit 138 and a digital combinatorial logic circuit 140 used to determine if the detected laser light 134 is coherent. If the laser light 134 is coherent, a high pulse is sent along the coherent detection flag line 116.

The event detector circuit 114 is a standard circuit than includes a high sensitivity detector 142 that converts the input laser light 134 into an electrical signal that is amplified by a pre-amplifier 144. The resulting amplified signal is input to a another analog threshold circuit 146 that establishes if the event detected by the high sensitivity detector 142 is sufficiently strong or has sufficient properties to trigger an event detection. If the input laser light 134 triggers an event detection via the analog threshold circuit 146, the circuit 146 sends a high pulse on the event detection flag line 118.

In the preferred embodiment, the present invention uses the ability of the Fabry-Perot etalon to limit detection to a defined region about the system 110 to distinguish between signals aimed at the host vehicle and those due to reflections from nearby objects or terrain. The Fabry-Perot etalon is maintained as the discriminator for laser energy. The corresponding detector set 132 is coupled to the sensitive optical event detector 142 that detects any optical event over a radiometric threshold corresponding to an offset that in turn corresponds to the potential reflection detection zone (see 68 of FIG. 3).

The present invention sorts reflected laser energy from directly incident laser energy by accounting for the time difference between an event detection and a corresponding coherent detection. If the corresponding coherent detection occurs almost immediately (less than 40 nanoseconds and typically less than 10 nanoseconds) after the initial event detection, then the event is associated with threatening laser energy. If the corresponding coherent detection occurs later than approximately 40 nanoseconds, the event is most probably due to a reflection. If a coherent detection occurs very long (greater than 200 nanoseconds) after the initial event detection then the coherent detection is most probably not due to a reflection.

Those skilled in the art will appreciate that the laser reflected signal determination circuit 120 may be easily adapted to work with the laser detection system of FIG. 3.

Figure 7:
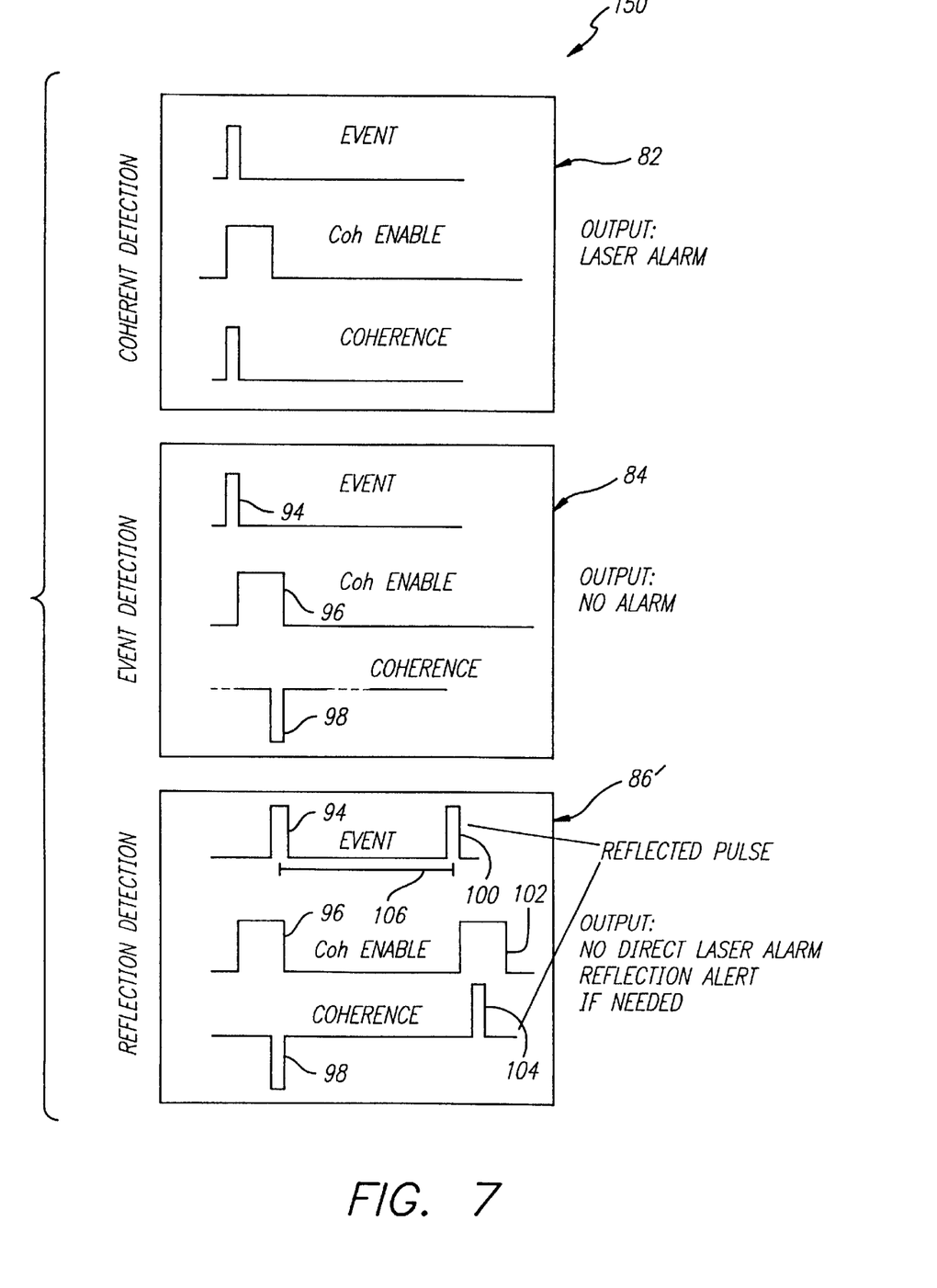
FIG. 7 is a timing diagram illustrating a method implemented by the system of FIGS. 6(a) and (b).

FIG. 7 is a timing diagram 150 illustrating the method implemented by the system of FIG. 6. Events corresponding to the first 82 and second frame 84 are treated by the system (see FIG. 6) of the present invention similar to the system 30 of FIG. 4. However, in a third frame 86', the pulses 94, 96, 98 from the previous second frame 84 are taken into account. The elapsed time 106 between the receipt of the subsequent pulses 100, 102, and 104 and the receipt of the previous pulses 94, 96, and 98 is measured. In the present example, the elapsed time is such that the event corresponding to the subsequent pulses 100, 102, and 104 is considered to be a reflection corresponding to the event associated with the previous pulses 94, 96, 98. If the elapsed time was larger than the $T_{max}$ threshold which is 200 microseconds in the present embodiment, the event corresponding to the pulses 100, 102, and 104 is associated with an event separate from the previous event associated with the previous pulses 94, 96, 98. If the elapsed time was smaller than the $T_{min}$ threshold which is 40 nanoseconds in the present embodiment, the event corresponding to the pulses 100, 102, and 104 is not considered to be a reflection, but rather a true laser detection.

Figure 8:
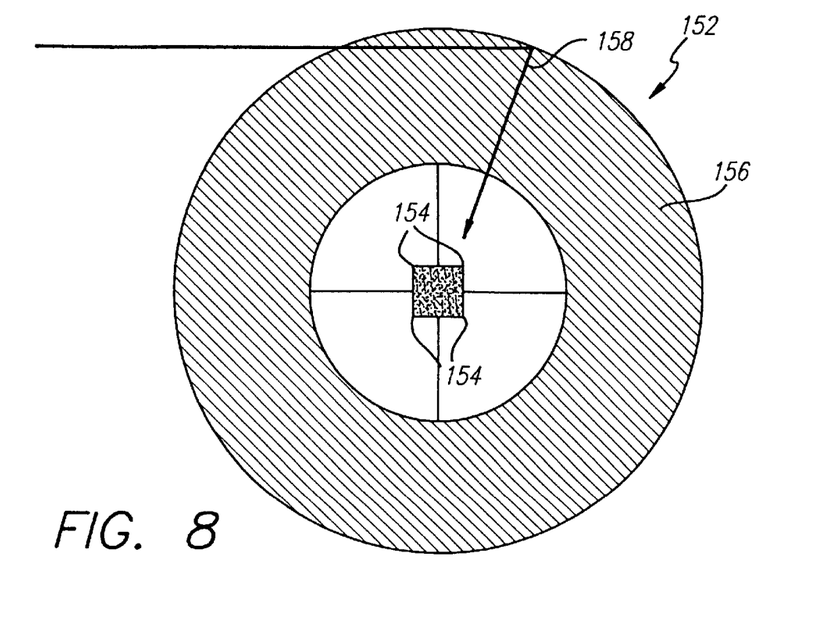
FIG. 8 is a diagram showing a 360 degree sensor field having four 90 degree sensors.

FIG. 8 is a diagram showing a 360 degree sensor field 152 having four 90 degree sensors 154. A potential reflection detection zone 156 surrounds a host vehicle that hosts the sensors 154. In such multiple sensor installations it is possible for a laser beam to be incident on two or more sensors where their fields of view overlap. It is also possible for a reflection 158 incident upon one sensor without the precursor event being detected by any of the sensors 154. In these situations, the timing and comparisons performed by the reflected signal detection circuit 120 of FIG. 6 are most suitably performed by a computer or central processing unit (not shown).

To facilitate direct beam versus reflected beam sorting by time of arrival in multiple sensor configurations, the inherent time delays from each sensor 154 through to the central processing unit are measured and used to calibrate the sensors. This calibration can be easily accomplished by the use of a single light source such as a light emitting diode, fiber-optically coupled to each sensor over fixed lengths of fiber optic cable so that the light arrives at each sensor simultaneously or by calibration of the relative electronic delays with an electronic test signal introduced at each sensor 154. This light source can be external to the system or can be located in the central processing unit for periodic time delay re-calibration if needed to compensate for time or temperature drifting. By determining the delay from each sensor to the central processing unit, the sensors can be calibrated to compensate out these delays.

Figure 9:
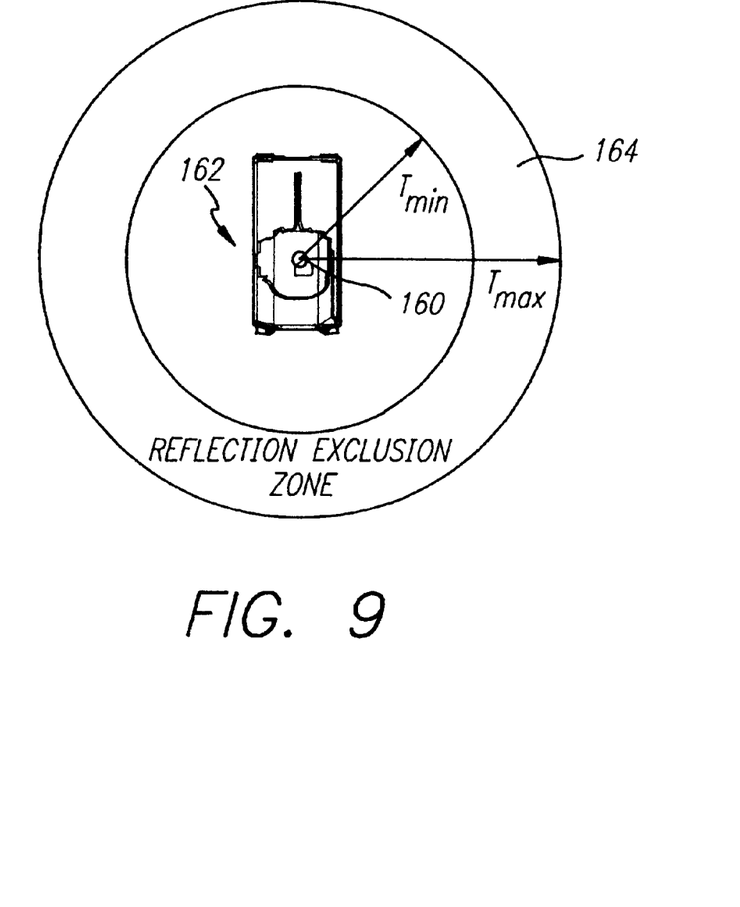
FIG. 9 is a top view of a sensor mounted on a tank, illustrating a region in which received electromagnetic energy is likely to be reflected electromagnetic energy.

FIG. 9 is a top view of a sensor 160 mounted on a tank 162, illustrating a region 164 in which received electromagnetic energy is likely to be reflected electromagnetic energy. The region 164 is a reflection exclusion zone and is defined by temporal boundaries which include $T_{min}$ and $T_{max}$. After the detection of a first event by the sensor 160, a lock-out period occurs corresponding to the difference $T_{max}-T_{min}$. Subsequent event detection occurring in the lockout period are considered to be reflections associated with the original event as shown in FIG. 10.

Figure 10:
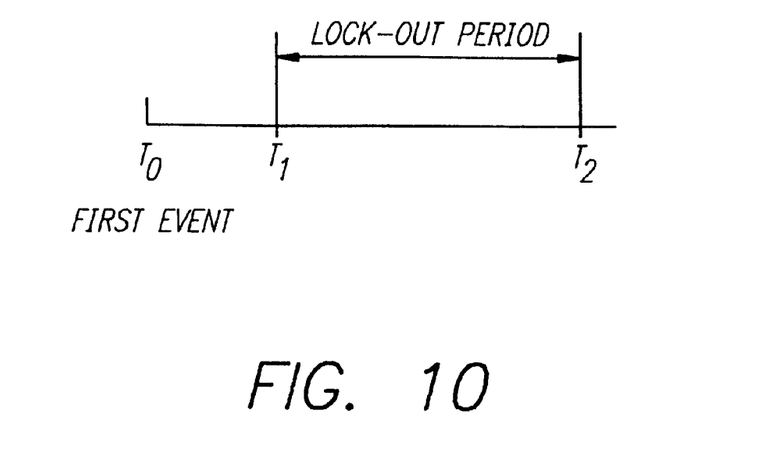
FIG. 10 is a linear graph showing temporal relationships between the detection of a first event and subsequent events considered to be reflections associated with the original event.

FIG. 10 is a linear graph showing temporal relationships between the detection of a first event, and subsequent events considered to be reflections associated with the original event.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,
What is claimed is:

1. A laser threat discrimination system comprising:
    first sensor means for detecting a first electromagnetic signal;
    second sensor means for detecting a coherent electromagnetic signal;
    timing means for establishing a time interval between detection of said first electromagnetic signal and detection of said coherent electromagnetic signal and providing an output in response thereto; and
    control means for determining if said first electromagnetic signal and/or said second electromagnetic signal is a direct or a reflected signal based on said output.

2. The invention of claim 1 wherein said electromagnetic signals are laser signals.

3. The invention of claim 2 wherein said first sensor means is a first detector which provides an event detection flag as an output in response to the detection of a first laser signal by said first detector.

4. The invention of claim 3 wherein said first detector includes a high sensitivity laser light detector.

5. The invention of claim 4 wherein said first detector includes a pre-amplifier and an analog threshold circuit.

6. The invention of claim 3 wherein said second sensor means includes a coherent detection circuit that provides a coherent detection flag as an output in response to the detection of a coherent laser signal by said coherent detection circuit.

7. The invention of claim 6 wherein said timing means includes a timing circuit that receives said event detection flag as input.

8. The invention of claim 7 wherein said timing circuit includes a digital clock circuit that starts a timer upon receipt of said event detection flag.

9. The invention of claim 7 wherein said control means includes a digital comparator circuit in communication with said timing circuit, said digital comparator circuit receiving said coherent detection flag as input.

10. The invention of claim 9 wherein said digital comparator circuit is activated by the receipt of said coherent detection flag which triggers a comparison between said output of said timing means and a time threshold and provides a reflection signal output indicating if said laser signal is a potential threat or not.

11. The invention of claim 10 wherein said time threshold is the maximum time value allowable for said output for determining that said laser is a potential threat.

12. The invention of claim 11 wherein said time threshold is approximately 10 nanoseconds.

13. The invention of claim 10 wherein said time threshold is the maximum time value allowable for said output for determining that said laser is a reflection and not a potential threat.

14. The invention of claim 13 wherein said time threshold is approximately 40 microseconds.

15. The invention of claim 2 wherein said control means is implemented with a computer.

16. A system for distinguishing non reflected electromagnetic energy from reflected electromagnetic energy comprising:
    first sensor means for detecting initial electromagnetic energy corresponding to a signal detected in a first region about said system;
    second sensor means for establishing the receipt of coherent electromagnetic energy in a second region about said system;
    association means for timing the receipt of said initial electromagnetic energy by said first sensor means and the receipt of said coherent electromagnetic energy by said second sensor means and providing an output in response thereto;
    issuing means for issuing a first signal if said output is less than a predetermined threshold, issuing a second signal if said output is greater than said threshold, and issuing a third signal if said output indicates that said coherent electromagnetic energy was not received; and determination means for determining if said electromagnetic energy is reflected or non reflected based on receipt by said determination means of said first, second, and/or third signal.

17. The invention of claim 16 wherein said second region is closer to said system than said first region.

18. The invention of claim 16 wherein said first sensor means includes a sensor.

19. The invention of claim 16 wherein said second sensor means includes a coherent laser detector.

20. The invention of claim 19 wherein said coherent laser detector includes a Fabry-Perot etalon.

21. The invention of claim 16 wherein said electromagnetic energy is laser light.

22. The invention of claim 16 wherein said first signal indicates that said electromagnetic energy is non reflected electromagnetic energy.

23. The invention of claim 16 wherein said second signal indicates that said electromagnetic energy is reflected electromagnetic energy.

24. A laser threat discrimination method including the steps of:

detecting a first electromagnetic signal;

detecting a coherent electromagnetic signal;

establishing a time interval between detection of said first electromagnetic signal and detection of said coherent electromagnetic signal and providing an output in response thereto; and determining if said first electromagnetic signal and/or said second electromagnetic signal is a direct signal or a reflected signal based on said output.

* * * * *